UNITED STATES PATENT OFFICE.

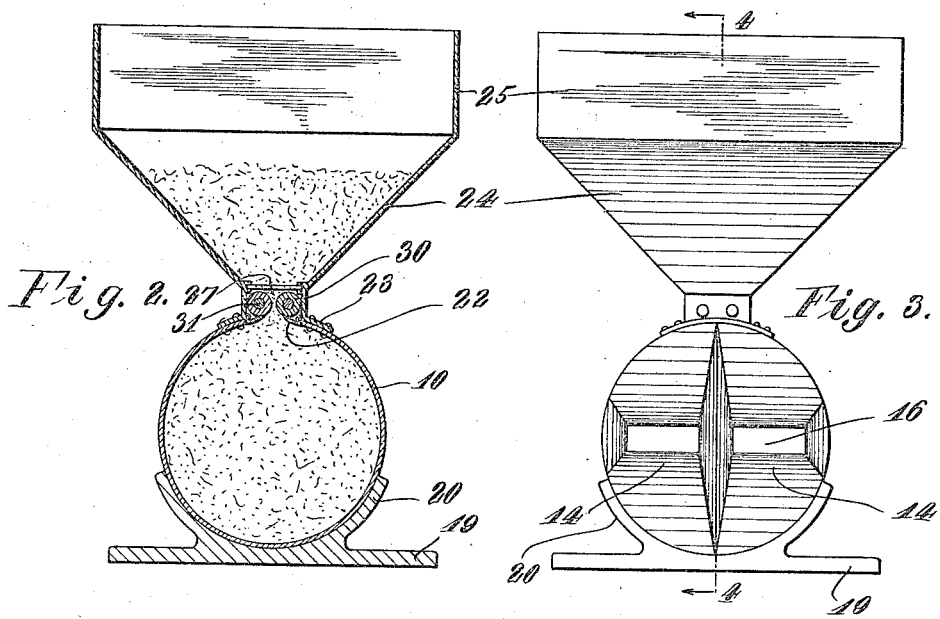
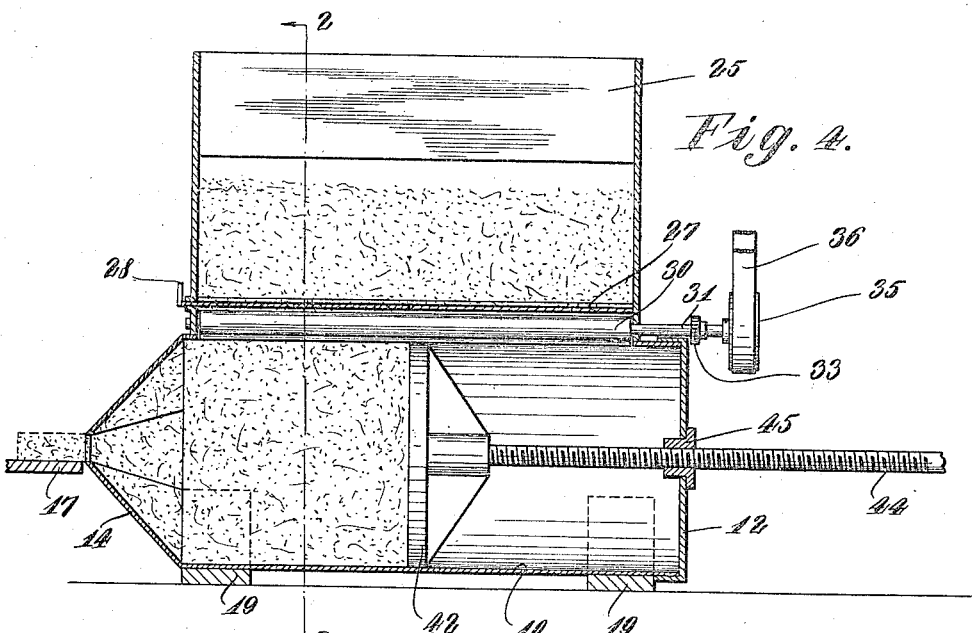

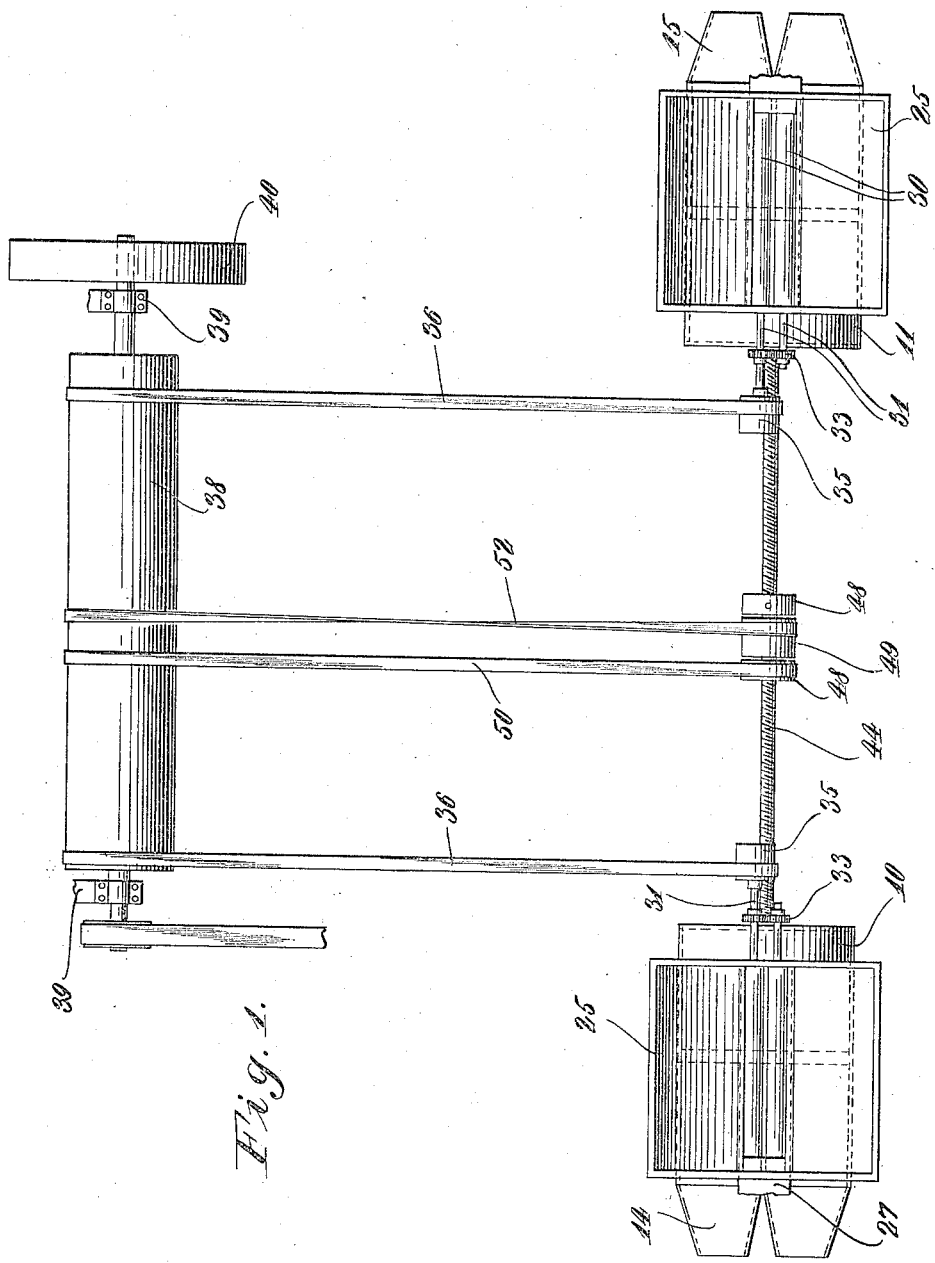

TIMOFEY P. TOMKOVICH, OF SPRINGFIELD, VERMONT.

BRICK-PRESS.

1,280,331. Specification of Letters Patent. Patented Oct. 1, 1918.

Application filed October 20, 1917. Serial No. 197,529.

*To all whom it may concern:*

Be it known that I, TIMOFEY P. TOMKOVICH, a citizen of Russia, resident of Springfield, county of Windsor, and State of Vermont, have invented certain new and useful Improvements in Brick-Presses, of which the following is a specification.

This invention relates to improvements in presses and particularly to types operating upon plastic material, such as clay and the like to produce any desired form.

The principal object of the invention is to provide a press comprised of two separate cylindrical tanks adapted to operate alternately so that as the contents of one are exhausted the other becomes filled.

This and other like objects are attained by the novel construction and combination of parts hereinafter described and shown in the accompanying drawings, forming a material part of the specification, and in which:—

Figure 1 is a plan view showing a press made in accordance with the invention.

Fig. 2 is a transverse sectional view taken on line 2—2 of Fig. 4.

Fig. 3 is an end view of the same, and

Fig. 4 is a sectional view taken on line 4—4 of Fig. 3.

A pair of cylindrical tanks 10 and 11, are provided with rigid heads 12, at their inner ends while at the outer opposite ends, two or more conical nozzles 14 and 15, are secured to the tanks, the ends of the conical nozzles being preferably rectangular, but may be given any desired shape, the effluent being delivered upon the plate 17, level with the lower edge of the openings 16.

These tanks 10 and 11 are mounted on supports 19 having curved upper surfaces 20 fitted to the exterior of the cylinders, each of which are formed with longitudinal openings 22, and secured at the margin of the openings are the feet 23 of hoppers 24, having beveled sides terminating in vertical containers 25, at their open upper ends, the same being suited to receive the pulverized material of which the articles are to be made.

The openings 22 to the cylinders are covered normally by plates 27, the same acting as slide valves and provided with extending operative handles 28, at one end by means of which they may be withdrawn when desired so the contents of the hoppers 24, are delivered to pairs of rollers 30, rigidly mounted upon shafts 31 in the ends of the hoppers 24, immediately adjacent to the openings 22.

The extending ends of the shafts 21 have fitted to them pairs of gears 33, so as to cause the rollers 30 to rotate, thereby tending to feed the material downward when the plates 27 are retracted.

One of the shafts 31, is further extended and provided with a driving pulley 35, operated by the belts 36, from a cylindrical roller 38, journaled in bearings 39, and driven by the pulley 40, from any convenient source of power. Within the cylinders 10 and 11 are plunger heads 42 actuatable by the screw 44 the same being engaged in bushings 45 set in the heads 12, it being understood that the screw 44 extends inward from the rear end of each cylinder thereby operating both plungers 42.

Means for rotating the screw 44, is provided by the pulleys 48, pinned to the screw, while therebetween is a loose pulley 49, the arrangement being such that either the open belt 50 or cross belt 52 may be engaged with the tight pulleys thereby turning the screw in either direction, the belt being driven by the cylindrical roller 38.

In operation, the hopper 24, having been filled with the desired quantity of the material to be used, the plate 27 may now be withdrawn and the machine started, the rolls 30, tending to cause the entrance of the material into cylinders 10 and 11, and when one of the cylinders is filled the screw 44 is caused to revolve, moving the plungers 42 toward the opening 16, causing the material to be extruded as indicated after which it may be cut by any ordinary means into desired lengths.

Obviously when one of the plungers 42 has reached the extremity, the belts are shifted so as to cause a reverse movement of the screw 44, and the plate 27, moved in to cover the opening to the cylinders, and the belts shifted so as to cause the plungers to advance.

Having thus described my invention what I claim as new and desire to secure by Letters Patent is:—

In a brick molding machine of the character described, the combination of two molding cylinders, curved supports for said cylinders, superposed hoppers on said cylinders, plates for closing the lower mouths of said hoppers, extending operative handles on said plates for withdrawing and returning the plates from and into their operative positions, shafts mounted in the ends of said hoppers, a pair of rollers underneath of said plates rigidly secured to said shafts, means for rotating said shafts and rollers for feeding the material from said hoppers to said cylinders, plunger heads sliding within said cylinders, a common screw rod connecting both plungers, means for rotating the screw rod in either direction, a plurality of conical nozzles at the outer ends of said cylinders, said nozzles having preferably rectangular cross-section, and tables underneath of said nozzles for the reception of the molded and cut material.

In testimony whereof I have affixed my signature.

TIMOFEY P. TOMKOVICH.

Copies of this patent may be obtained for five cents each, by addressing the "Commissioner of Patents, Washington, D. C."